J. H. LIGHT.
Bee-Hive.
No. 197,481. Patented Nov. 27, 1877.
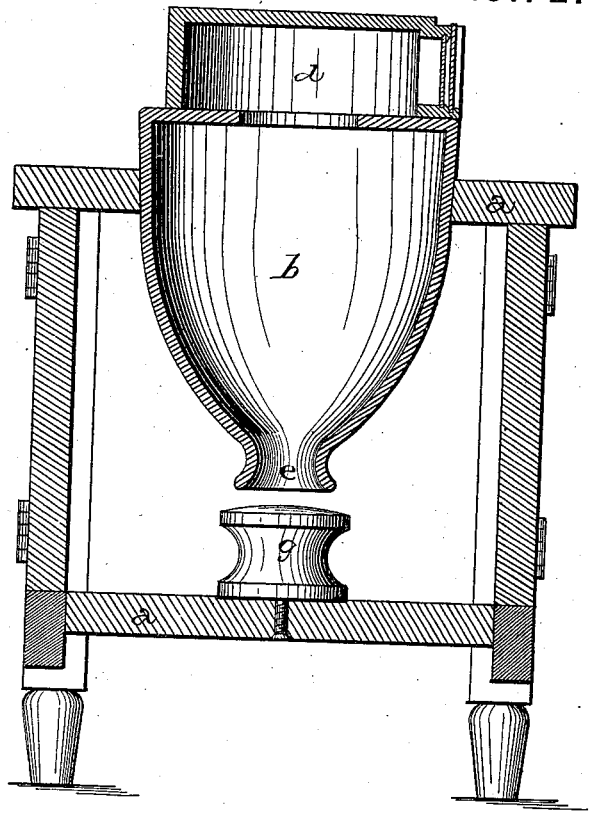
WITNESSES.
INVENTOR.

UNITED STATES PATENT OFFICE.

JOHN HARDEN LIGHT, OF CALHOUN, MISSOURI.

IMPROVEMENT IN BEE-HIVES.

Specification forming part of Letters Patent No. 197,481, dated November 27, 1877; application filed October 3, 1877.

*To all whom it may concern:*

Be it known that I, JOHN H. LIGHT, of Calhoun, in the county of Henry and State of Missouri, have invented certain new and useful Improvements in Bee-Hives; and I do hereby declare the following to be a full, clear, and exact description of the invention, such as will enable others skilled in the art to which it pertains to make and use it, reference being had to the accompanying drawing, which forms part of this specification.

My invention relates to an improvement in bee-hives; and it consists in forming the hive out of earthenware, and so forming its lower end as to prevent moths and millers from laying their eggs in or near the entrance to the hive, as will be more fully described hereinafter.

The accompanying drawing represents my invention, $a$ being a frame-work of any suitable construction, in which the hive $b$ is supported in position. This frame-work may be entirely open upon one side, and provided with doors upon the other sides, so as to admit light and sunshine, or all of the sides may be provided with doors, so that the hive can be closed at night or during cold weather. Where one side is left open, as here shown, the frame should be turned toward the north, so that the sunshine of the morning will shine directly upon the hive.

The hive itself and the honey-box $d$ upon its top are made out of earthenware, which being warm in the winter and cool in the summer, and having no cracks or crevices about it in which the moths or millers can lay their eggs, is much better adapted for being used as a hive than any other material.

The top of this hive $d$ is made perfectly straight and flat, and the upper portions of the sides are made straight and vertical for about one-third of their length. The sides then curve inward toward each other down to the mouth $e$, which mouth is made round and flaring, and largest at its lower edge. The lower outside end of the hive is made to conform to the inside shape, so as to afford no possible place upon which moths or millers can find a resting place to lay their eggs. When the hive is glazed its outer side will be so smooth that insects cannot well climb up its sides. Owing to the shape of the inside of the hive, access is made difficult to all other insects than the bees. By having the mouth $e$ formed flaring, as here shown, there is no possibility of a moth or miller finding a place to deposit its eggs, and hence the bees will be spared from their depredations. The honey-box upon the top of the hive is provided with the usual window or light, so as to enable a person to examine into the condition of the honey at any time.

Having thus described my invention, I claim—

The hive $d$, made of earthenware, and having the inwardly-curved sides and flaring mouth $e$, the outside of the lower end of the hive being made to conform to the inside, all substantially as shown and described.

In testimony that I claim the foregoing I have hereunto set my hand this 29th day of September, 1877.

JOHN H. LIGHT.

Witnesses:
F. A. SMITH,
H. J. UNDERWOOD.